(12) United States Patent
MacDonald et al.

(10) Patent No.: US 8,658,241 B2
(45) Date of Patent: Feb. 25, 2014

(54) SIMULTANEOUS POLYMERIZATION OF TWO VINYL MONOMER MIXTURES TO OPPOSITE FACES OF A FLAT POROUS SUBSTRATE

(75) Inventors: Russell James MacDonald, Wilimington, MA (US); Liping Zheng, Shanghai (CN); John Barber, Fergus (CA); Hai Yang, Shanghai (CN)

(73) Assignee: General Electric Company, Schenectady, NY (US)

( * ) Notice: Subject to any disclaimer, the term of this patent is extended or adjusted under 35 U.S.C. 154(b) by 646 days.

(21) Appl. No.: 12/981,595

(22) Filed: Dec. 30, 2010

(65) Prior Publication Data

US 2012/0171361 A1 Jul. 5, 2012

(51) Int. Cl.
*B05D 5/12* (2006.01)
(52) U.S. Cl.
USPC ............................ 427/77; 427/209; 427/372.2
(58) Field of Classification Search
USPC .......................................... 427/77, 209, 372.2
See application file for complete search history.

(56) References Cited

U.S. PATENT DOCUMENTS

| | | | | |
|---|---|---|---|---|
| 3,350,553 A | * | 10/1967 | Cline | 362/34 |
| 3,894,710 A | * | 7/1975 | Sarofeen | 249/117 |
| 5,056,996 A | * | 10/1991 | Papastavros et al. | 425/110 |
| 5,145,618 A | * | 9/1992 | MacDonald et al. | 264/46.3 |
| 5,194,189 A | * | 3/1993 | Papastavros et al. | 264/495 |
| 5,264,125 A | * | 11/1993 | MacDonald et al. | 210/500.35 |
| 7,833,400 B2 | | 11/2010 | Andelman et al. | |
| 2005/0103634 A1 | * | 5/2005 | Andelman et al. | 204/630 |
| 2006/0173084 A1 | * | 8/2006 | Zheng et al. | 521/27 |

* cited by examiner

*Primary Examiner* — Michael Cleveland
*Assistant Examiner* — Sarah R Anderson
(74) *Attorney, Agent, or Firm* — Wegman, Hessler & Vanderburg

(57) ABSTRACT

A bi-polar electrode having ion exchange polymers on opposite faces of a porous substrate is formed using a method that includes providing an electrode substrate with activated carbon layers on opposite faces of the electrode substrate, wherein said faces have an outer perimeter band void of the activated carbon layers. The electrode substrate is placed in a thermoplastic envelope formed by a pair of polyethylene films. A Mylar sheet is placed in each side of the envelope against the electrode substrate, and the envelope is thermally sealed to the outer perimeter band of the electrode substrate void of activated carbon to form a first pocket on one side of the electrode substrate and a second pocket on the opposite side of the electrode substrate. The method also includes inserting a first polymerizable monomer mixture having an anion exchange group into the first pocket of the envelope and inserting a second polymerizable monomer mixture having a cation exchange group into the second pocket of the envelope. The first and second polymerizable monomers mixtures are then polymerized in an oven.

7 Claims, 1 Drawing Sheet

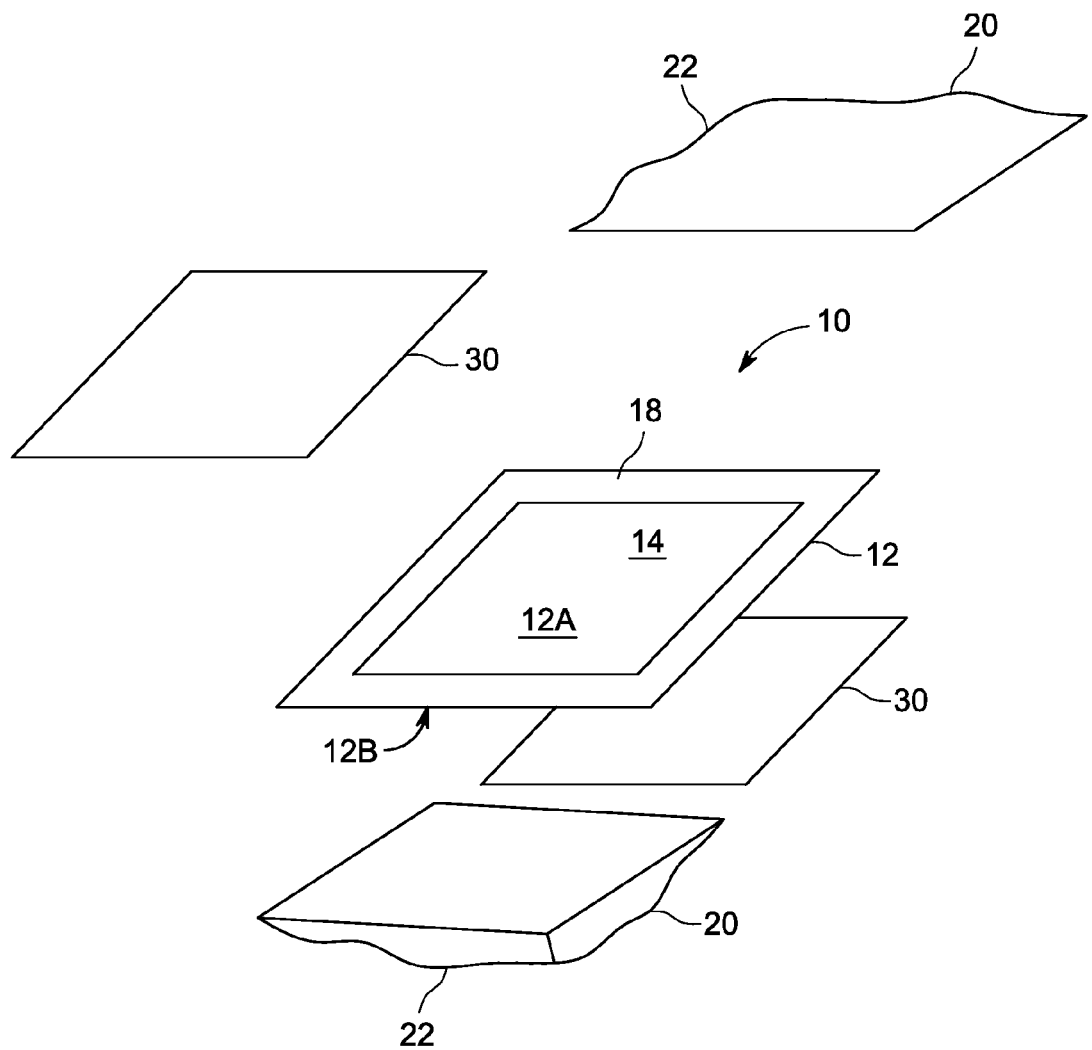

SIMULTANEOUS POLYMERIZATION OF TWO VINYL MONOMER MIXTURES TO OPPOSITE FACES OF A FLAT POROUS SUBSTRATE

BACKGROUND OF THE INVENTION

1. Field of the Invention

The invention relates to bi-polar electrodes, and more particularly, to a method of simultaneously applying two dissimilar ion exchange polymers to opposite faces of the electrode substrate.

2. Description of Related Art

It is increasingly desirable to purify water using passive deionization. Passive deionization uses bi-polar electrodes, e.g., two sheets having a first side or face formed of material with cation-exchange functionality, and a second side or face with anion-exchange functionality. Each of the two different layers of ion exchange material is porous or otherwise somewhat permeable to a neutral fluid by virtue of its chemistry, physical structure and degree of cross-linking, and each layer possesses ion exchange functionality that operates to transport one type of ion across the material in an electric field, while substantially or effectively blocking most ions of the opposite polarity. With the two materials of different exchange type positioned face-to-face in adjacent layers, ions are effectively "blocked" by one or the other layer and thus cannot traverse the sheet.

Applying the ion exchange monomers to the separate sides of the electrode and polymerizing them creates a bi-polar electrode that is more efficient to operate than a series of monoplanar electrodes with ion exchange membranes pressed against them. In this regard, there is a desire to provide new processes for bi-polar electrode fabrication.

SUMMARY OF THE INVENTION

In one aspect, the invention is directed to a method of forming a bi-polar electrode having ion exchange polymers on opposite faces of a porous substrate. The method includes providing an electrode substrate with activated carbon layers on opposite faces of the electrode substrate, wherein said faces have an outer perimeter band void of the activated carbon layers. The electrode substrate is placed in a thermoplastic envelope formed by a pair of polyethylene films. A Mylar sheet is placed in each side of the envelope against the electrode substrate, and the envelope is thermally sealed to the outer perimeter band of the electrode substrate void of activated carbon to form a first pocket on one side of the electrode substrate and a second pocket on the opposite side of the electrode substrate. The method also includes inserting a first polymerizable monomer mixture having an anion exchange group into the first pocket of the envelope and inserting a second polymerizable monomer mixture having a cation exchange group into the second pocket of the envelope. The first and second polymerizable monomers mixtures are then polymerized in an oven.

The present invention and its advantages over the prior art will become apparent upon reading the following detailed description and the appended claims with reference to the accompanying drawings.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein:

FIG. 1 illustrates a schematic of a bi-polar electrode made according to an embodiment of the invention.

Corresponding reference characters indicate corresponding parts throughout the views of the drawings.

DETAILED DESCRIPTION OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications, and equivalents as will become apparent from consideration of the following detailed description.

Referring to FIG. 1, a bi-polar electrode 10 comprising a substantially flat electrode substrate 12 with different ion exchange polymer coatings on its opposite sides is shown. The substrate 12 is a porous support with an intermediate conductive film. Desirably, the electrode substrate 12 is made of a thermoplastic polyethylene film to which activated carbon layers are bonded to each face 12A, 12B of the film to form the porous support. The opposite faces 12A, 12B of the electrode substrate are coated with different ion exchange polymers. According to the invention the opposite faces 12A, 12B of the electrode substrate 12 are simultaneously coated with two vinyl monomer mixtures and undergo simultaneous polymerization. Thus, the method described below is particularly suited for simultaneous formation of two dissimilar ion exchange polymer coatings on opposite faces of the electrode substrate.

The electrode substrate 12 is made of a thermoplastic film to which an activated carbon layer 14 is bonded on each face 12A, 12B of the film. The artisan will appreciate that a host of other materials may be used to form the electrode substrate. For example, activated carbon containing fillers such as resins and binding agents such as TFE and PVDF can be mentioned. In one desirable embodiment, the substrate 12 is generally rectangular-shaped with sides about 10 inches by 21.5 inches in length. However, one skilled in the art will understand that these dimensions are for example purposes only, and other dimensions may be used without departing from the scope of the invention. An outer perimeter of the substrate has a band 18 that is left void of the activated carbon layer 14.

A two-pocket envelope 20 is formed around the electrode substrate. By covering the porous electrode substrate 12 with the envelope 20, the hindrance of polymerization by oxygen is prevented and surface smoothness is obtained. In one embodiment, the envelope 20 is formed with two generally rectangular polyethylene films 22 having three sides bonded together and one side open so that the electrode substrate 12 may be placed into the envelope. The polyethylene films 22 of the envelope 20 are thermally sealed to the band 18 of the electrode substrate 12 void of activated carbon 14 around the perimeter of the substrate, thereby forming a first pocket on one side of the electrode substrate 12 and a second pocket on the opposite side of the electrode 12 around the activated carbon 14. A plastic or Mylar sheet 30 (i.e., polyethylene terephthalate) is inserted in each pocket of the envelope 20 between the polyethylene film 22 and the electrode substrate 12. In one embodiment, the envelope 20 containing the electrode substrate 12 is then placed between two rigid plates and the plates are clamped together.

A first vinyl monomer solution is added to the first pocket formed on the first face 12A of the substrate and a second vinyl monomer solution is added to the second pocket formed around the second face 12B of the substrate. The first and second solutions are non-identical. The liquid monomers displace the air in the activated carbon. In one embodiment, a vacuum is drawn to remove air from the activated carbon.

Desirably, the first pocket is filled with a first polymerizable monomers mixture comprising a polymerizable monomer having an anion exchange group or a group that can be converted to an anion exchange group. Means for inserting the first polymerizable monomers mixture into the first pocket is inserted into the envelope. In one embodiment, a transfer pipette may be used to insert the first polymerizable monomers mixture into the first pocket between the Mylar and the electrode substrate. In one embodiment, the first polymerizable monomers mixture includes a crosslinking agent and a polymerization initiator. The first polymerizable monomers mixture is infiltrated or imbedded into the voids of the porous substrate film, and the polymerizable monomer mixture infiltrated is polymerized. Any known polymerizable monomer can be used with no restriction as the first polymerizable monomer having an anion exchange group or a group that can be converted to an anion exchange group. Examples of polymerizable monomer having an anion exchange group are, for example, trimethylammonium methyl methacrylate chloride, methacryloxypropyltrimethylethyl ammonium chloride, vinylbenzyltrimethyl ammonium chloride, diallyldimethyl ammonium chloride and the like and other ethylenically unsaturated quaternary ammonium and tertiary amine monomers may be mentioned.

Desirably, the second pocket is filled with a second polymerizable monomers mixture comprising a polymerizable monomer having a cation exchange group or a group that can be converted to a cation exchange group. Means for inserting the second polymerizable monomers mixture into the second pocket is inserted into the envelope. In one embodiment, a transfer pipette similar to the one used with the first pocket may be used to insert the second polymerizable monomers mixture into the second pocket between the Mylar and the electrode substrate. In one embodiment, the second polymerizable monomers mixture includes a crosslinking agent and a polymerization initiator. The polymerizable monomers mixture is infiltrated or imbedded into the voids of the porous substrate film, and the polymerizable monomer mixture infiltrated is polymerized. Any known polymerizable monomer can be used with no restriction as the second polymerizable monomer having the cation exchange group or a group that can be converted to the cation exchange group. Examples of polymerizable monomer having a cation exchange group are, for example, sulfoethylmethacrylate, acrylamidomethylpropane, sulfonic acid, sodium styrenesulfonate, sulfopropylmethacrylate potassium salt, and the like may be mentioned and the like, and salts and derivatives thereof. Other ethylenically unsaturated sulfonic acids and carboxylic acids can also be mentioned.

As to the crosslinking agent added to the first or second polymerizable monomers mixtures, there is no particular restriction. There can be mentioned, for example, divinylbenzene, divinylsulfone, butadiene, chloroprene, divinylbiphenyl, trivinylbenzene, divinylnapthelene, diallylamine, divinylpyridine, ethyleneglycoldimethacrylate, other di or multi acrylates or di or multimethacrylates of polyols. Latent crosslinking systems such as hydroxymethyl acrylamide plus acrylamide or hydroxymethylacrylamide and phenol can also be employed.

As the polymerization initiator, known compounds can be used with no particular restriction. There can be used, for example, organic peroxides such as octanoyl peroxide, lauroyl peroxide, tert-butyl peroxy-2-ethylhexaonate, benzoyl peroxide, tert-butyl peroxyisobutylate, tert-butyl peroxylaurate, tert-hexyl peroxybenzoate, di-tert-butyl peroxide, and organic azo compounds such as azobisisobutyronitrile and the like.

In the first and second polymerizable monomers mixtures, the proportions of the polymerizable monomer having the anion or cation exchange groups or groups which can be converted to the anion or cation exchange groups, the crosslinking agent and the polymerization initiator may be in wide ranges as long as each component is present in an amount necessary for the polymerization. The proportion of the crosslinking agent is preferably about 0.4-60 mol %, more preferably about 1 to 50 mol %, most preferably about 1 to about 40 mol %. of the total amount of the polymerizable monomer having an ion exchange group or a group which can be converted to an ion exchange group and the crosslinking agent. The polymerization initiator is used in an amount of generally.

In one embodiment, after the first and second polymerizable monomer mixtures are inserted into the first and second chambers, the first and second polymerizable monomer mixtures are allowed to stand for a selected duration of time. Suitable durations are generally between about 1 and 20 minutes, more preferably between about 5 and 15 minutes, and in one embodiment about 10 minutes. After standing, the excessive portions of the polymerizable monomer mixtures may then be removed before the polymerizable mixtures are polymerized.

In producing the bi-polar electrode 10, the polymerizable monomers mixture is contacted with the porous substrate formed by the activated carbon layer on the electrode substrate, as described previously. The polymerization is preferably conducted after covering the porous membrane with the two-pocket envelope. In polymerizing the polymerizable monomers mixture, a known polymerization method is employed with no restriction. In one embodiment, the envelope containing the electrode substrate is placed in an oven and the vinyl monomers are polymerized onto the faces of the substrate. Thermal polymerization using a polymerization initiator is preferred generally because the operation is easy and polymerization can be conducted relatively uniformly. The temperature of the thermal polymerization is not particularly restricted and a known temperature condition may be selected appropriately. Suitable temperatures are generally between 50 and 150° C., more preferably between 60 and 120° C., and in one embodiment, about 85° C. The duration of the thermal polymerization is also not particularly restricted and known duration conditions may be selected appropriately. Suitable durations are generally between about 10-120 minutes, more preferably about 45-90 minutes and in one embodiment about 60 minutes. Polymerization of the polymerizable monomers mixture may also be by any known chemical catalytic procedure or using ultraviolet light without departing from the scope of the invention.

In order that those skilled in the art will be better able to practice the present disclosure, the following example is given by way of illustration and not by way of limitation.

EXAMPLE

The electrode 10 was made by cutting the electrode substrate 12 with activated carbon layers 14 to a size of 10 inches (25.4 cm) by 21.5 inches (54.6 cm). The outer perimeter band 18 of the electrode substrate was maintained free of activated carbon, leaving 1.5 inches (3.8 cm) of trim around the two long side edges and the short bottom edge of the electrode substrate. The top edge was cut to 2 inches. The envelope 20 was made with an 11 inches (27.9 cm) by 21.5 inches (54.6 cm) polyethylene bag film with one long side open. The electrode substrate was placed between the polyethylene bag films 22.

The polyethylene films 22 of the envelope 20 were thermally sealed to the area 18 of the electrode substrate 12 void of carbon around the perimeter of the substrate, thereby forming a pouch on each side of the electrode substrate around the activated carbon. The envelope 20 was sealed to the substrate ½ inch (1.3 cm) from edge of the substrate on the two long sides and on the bottom side forming an envelope with one open side. ½ inch (1.3 cm) of each long side of envelope was cut off. A Mylar sheet 30 was inserted in each side of the envelope against the electrode substrate. The envelope was placed between two glass plates and the envelope/glass plate sandwich was clamped together. A transfer pipette was inserted into each side of the envelope between the Mylar and the electrode substrate. Desirably, the envelope/glass plate sandwich was held in a vertical position with the open end and pipettes at the top. The envelope/glass plate sandwich was clamped in place using a ring stand with two clamps on a Mylar tray.

140 grams of the first polymerizable monomer mixture having an anion exchange group was poured through one pipette into the first pocket of the envelope and 140 grams of the second polymerizable monomer mixture having a cation exchange group was poured through the other pipette into the second pocket of the envelope. The sides of the sandwich were clipped at 2 inch (5.1 cm) intervals, alternately, until the level of the mixtures was above the electrode substrate. The mixtures were allowed to stand for 10 minutes.

The envelope 20 was removed from the glass sandwich and placed in the Mylar tray. The long edge of the electrode substrate was placed near the bottom surface on the envelope and pushed against the envelope. The electrode substrate was moved from the bottom of the envelope to the top of the envelope with constant pressure, sweeping the excess monomer mixture from the envelope into the Mylar tray. The envelope was turned over and the procedure repeated on the other side of the envelope.

The envelope 20 was then placed between the two glass plates and four large clips were attached at the bottom edge of the envelope/glass sandwich assembly. Six clips were attached on each side edge of the envelope/glass sandwich assembly, alternately putting on the clips from bottom to the top. Four clips were attached at the top edge of the envelope/glass sandwich. The envelope/glass sandwich assembly was then placed horizontally into a preheated 85° C. oven for one hour.

The envelope/glass sandwich assembly was removed from the oven and was allowed to cool for ½ hour. The clips were then removed and the envelope was separated from the glass plates. The envelope and Mylar were removed from the electrode and the electrode was placed into 1N sodium chloride until ready for use.

The artisan can also appreciate the fact that pressure can be applied to the envelopes pressing the polymerizing AIX and CIX materials into a flat, planar disposition within their respective envelopes.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the scope of the disclosure as defined by the following claims.

What is claimed is:

1. A method of forming a bi-polar electrode having ion exchange polymers on opposite faces of a porous substrate, the method comprising:
   providing an electrode substrate with activated carbon layers on opposite faces of the electrode substrate, wherein said faces have an outer perimeter band void of the activated carbon layers,
   placing the electrode substrate in a thermoplastic envelope formed by a pair of polyethylene films;
   thermally sealing the envelope to the outer perimeter band of the electrode substrate void of activated carbon to form a first pocket on one side of the electrode substrate and a second pocket on the opposite side of the electrode substrate;
   clamping the envelope between two rigid plates;
   inserting a first polymerizable monomer mixture having an anion exchange group into the first pocket of the envelope
   inserting a second polymerizable monomer mixture having a cation exchange group into the second pocket of the envelope; and
   polymerizing the first and second polymerizable monomers mixtures.

2. The method of claim 1, wherein the first and second polymerizable monomers mixtures are polymerized by thermal polymerization.

3. The method of claim 2, wherein the first and second polymerizable monomers mixtures are polymerized by placing the envelope and electrode substrate horizontally into an oven at 85° C.

4. The method of claim 1, wherein first anion polymerizable monomer mixture is selected from the group consisting of ethylenically unsaturated tertiary amine and quaternary amine compounds, and salts and derivatives thereof.

5. The method of claim 1, wherein second cation polymerizable monomer mixture is selected from the group consisting of ethylenically unsaturated sulfonic acids, and carboxylic acids, and salts and derivatives thereof.

6. The method of claim 1, further comprising inserting a Mylar sheet in each side of the envelope against the electrode substrate.

7. The method of claim 1, further comprising inserting a first transfer pipette into the first pocket of the envelope and a second transfer pipette into the second pocket of the envelope and inserting the first and second polymerizable monomer mixture into the first and second pockets through the first and second pipettes, respectively.

* * * * *